(12) United States Patent  (10) Patent No.: US 7,887,310 B2
Flanigan et al.  (45) Date of Patent: Feb. 15, 2011

(54) COMPRESSOR UNLOADING VALVE (75) Inventors: Paul J. Flanigan, Cicero, NY (US);
Kyle D. Wessells, Huntersville, NC (US); Francis P. Wilson, Jamesville, NY (US); Stephen L. Shoulders, Baldwinsville, NY (US)

(73) Assignee: Carrier Corporation, Farmington, CT (US)

( * ) Notice: Subject to any disclaimer, the term of this patent is extended or adjusted under 35 U.S.C. 154(b) by 687 days.

(21) Appl. No.: 11/813,768

(22) PCT Filed: Feb. 7, 2005

(86) PCT No.: PCT/US2005/003813

§ 371 (c)(1),
(2), (4) Date: Jul. 12, 2007

(87) PCT Pub. No.: WO2006/085863

PCT Pub. Date: Aug. 17, 2006

(65) Prior Publication Data

US 2009/0285710 A1  Nov. 19, 2009

(51) Int. Cl.
 *F03C 2/00* (2006.01)
 *F03C 4/00* (2006.01)
 *F04C 18/00* (2006.01)
(52) U.S. Cl. ............... 418/201.2; 418/87; 418/201.1; 418/180; 418/270; 417/279; 417/310; 251/61.4
(58) Field of Classification Search ............... 418/201.1, 418/201.2, 180, 87, 270, DIG. 1; 251/61.4; 417/282, 310, 279, 295; 137/599.18
See application file for complete search history.

(56) References Cited

U.S. PATENT DOCUMENTS

| 2,778,598 | A |   | 1/1957  | Bolling, Jr. |
| 3,593,959 | A | * | 7/1971  | Greene ................ 251/63.6 |
| 4,249,866 | A |   | 2/1981  | Shaw et al. |
| 4,678,406 | A |   | 7/1987  | Pillis et al. |
| 5,044,894 | A |   | 9/1991  | Field et al. |
| 6,082,985 | A |   | 7/2000  | Suzuki et al. |
| 6,302,668 | B1 |  | 10/2001 | Lee |
| 6,431,210 | B1 | * | 8/2002 | Lowe et al. ............ 137/599.18 |
| 6,739,853 | B1 |  | 5/2004  | Tang et al. |

FOREIGN PATENT DOCUMENTS

EP  0177234 A2  4/1986
JP  5-52195  3/1993

OTHER PUBLICATIONS

European Office Action for EP Patent Application No. 05713015.5, dated Sep. 15, 2010.

* cited by examiner

*Primary Examiner*—Theresa Trieu
(74) *Attorney, Agent, or Firm*—Bachman & LaPointe, P.C.

(57) ABSTRACT

A compressor (20) has an unloading slide valve (100). The valve has a valve element (102) having a range between a first condition and a second condition, the second condition being unloaded relative to the first condition. A piston (124) is in a cylinder (128) and mechanically coupled to the valve element. A control valve (40; 42) is coupled to a headspace (138) of the cylinder to selectively expose the headspace to a fluid source (144), pressure of fluid in the headspace producing a force on the piston and valve element in a direction from the second condition toward the first condition. The compressor includes means (190, 192; 210; 220) for relieving excess pressure in the headspace.

22 Claims, 7 Drawing Sheets

COMPRESSOR UNLOADING VALVE

BACKGROUND OF THE INVENTION

The invention relates to compressors. More particularly, the invention relates to refrigerant compressors.

Screw-type compressors are commonly used in air conditioning and refrigeration applications. In such a compressor, intermeshed male and female lobed rotors or screws are rotated about their axes to pump the working fluid (refrigerant) from a low pressure inlet end to a high pressure outlet end. During rotation, sequential lobes of the male rotor serve as pistons driving refrigerant downstream and compressing it within the space between an adjacent pair of female rotor lobes and the housing. Likewise sequential lobes of the female rotor produce compression of refrigerant within a space between an adjacent pair of male rotor lobes and the housing. The interlobe spaces of the male and female rotors in which compression occurs form compression pockets (alternatively described as male and female portions of a common compression pocket joined at a mesh zone). In one implementation, the male rotor is coaxial with an electric driving motor and is supported by bearings on inlet and outlet sides of its lobed working portion. There may be multiple female rotors engaged to a given male rotor or vice versa.

When one of the interlobe spaces is exposed to an inlet port, the refrigerant enters the space essentially at suction pressure. As the rotors continue to rotate, at some point during the rotation the space is no longer in communication with the inlet port and the flow of refrigerant to the space is cut off. After the inlet port is closed, the refrigerant is compressed as the rotors continue to rotate. At some point during the rotation, each space intersects the associated outlet port and the closed compression process terminates. The inlet port and the outlet port may each be radial, axial, or a hybrid combination of an axial port and a radial port.

It is often desirable to temporarily reduce the refrigerant mass flow through the compressor by delaying the closing off of the inlet port (with or without a reduction in the compressor volume index) when full capacity operation is not required. Such unloading is often provided by a slide valve having a valve element with one or more portions whose positions (as the valve is translated) control the respective suction side closing and discharge side opening of the compression pockets. The primary effect of an unloading shift of the slide valve is to reduce the initial trapped suction volume (and hence compressor capacity); a reduction in volume index is a typical side effect. Exemplary slide valves are disclosed in U.S. Patent Application Publication No. 20040109782 A1 and U.S. Pat. Nos. 4,249,866 and 6,302,668.

SUMMARY OF THE INVENTION

According to one aspect of the invention, a compressor has an unloading slide valve. The valve has a valve element having a range between a first condition and a second condition, the second condition being unloaded relative to the first condition. A piston is in a cylinder and mechanically coupled to the valve element. A control valve is coupled to a headspace of the cylinder to selectively expose the headspace to a fluid source, pressure of fluid in the headspace producing a force on the piston and valve element in a direction from the second condition toward the first condition. The compressor includes means for relieving excess pressure in the headspace.

In various implementations, the means may include a passageway through or around the piston. The means may include a pressure relief valve. The means may be provided in a remanufacturing of a compressor or the reengineering of a compressor configuration from an initial baseline configuration.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
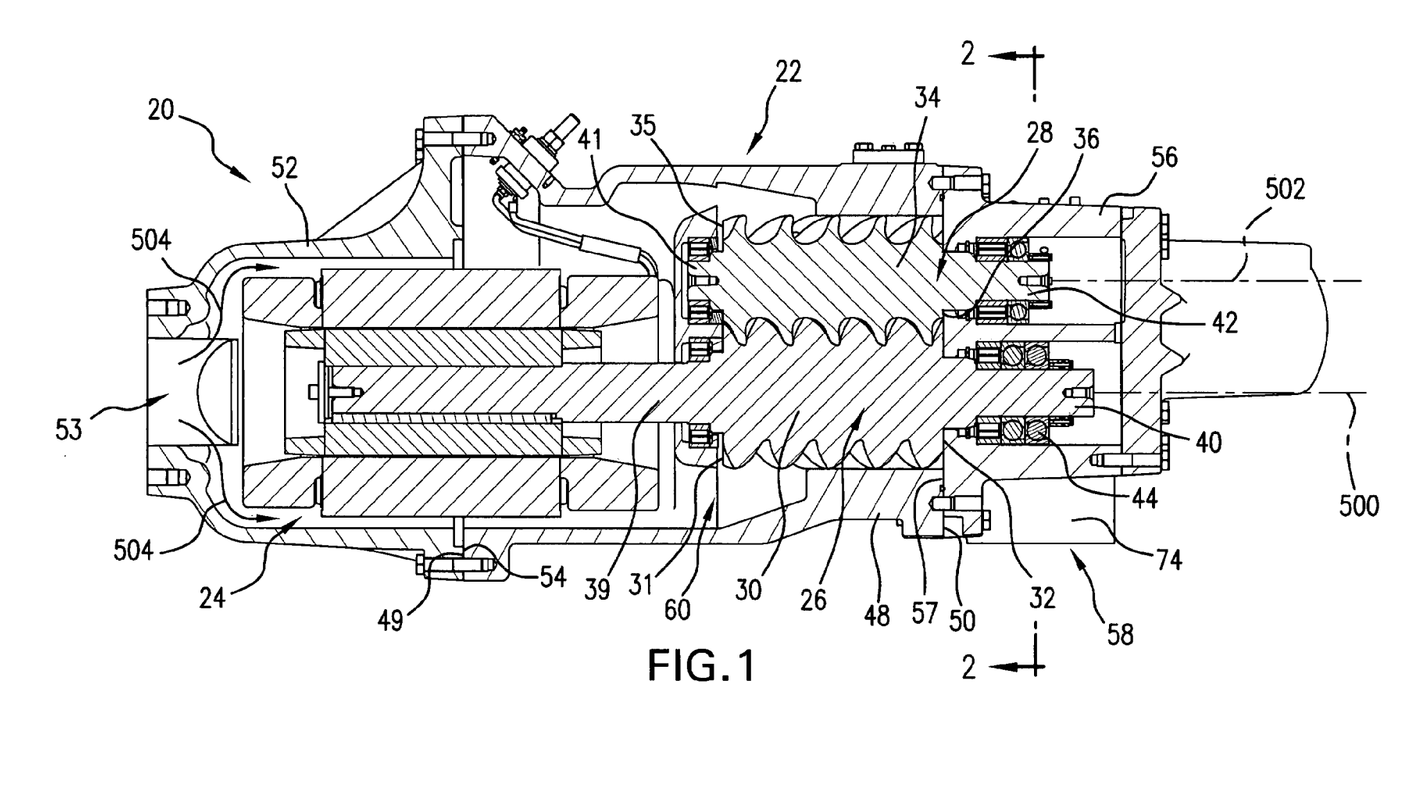
FIG. 1 is a longitudinal sectional view of a compressor.

FIG. 1 shows a compressor 20 having a housing assembly 22 containing a motor 24 driving rotors 26 and 28 having respective central longitudinal axes 500 and 502. In the exemplary embodiment, the rotor 26 has a male lobed body or working portion 30 extending between a first end 31 and a second end 32. The working portion 30 is enmeshed with a female lobed body or working portion 34 of the female rotor 28. The working portion 34 has a first end 35 and a second end 36. Each rotor includes shaft portions (e.g., stubs 39, 40, 41, and 42 unitarily formed with the associated working portion) extending from the first and second ends of the associated working portion. Each of these shaft stubs is mounted to the housing by one or more bearing assemblies 44 for rotation about the associated rotor axis.

In the exemplary embodiment, the motor is an electric motor having a rotor and a stator. One of the shaft stubs of one of the rotors 26 and 28 may be coupled to the motor's rotor so as to permit the motor to drive that rotor about its axis. When so driven in an operative first direction about the axis, the rotor drives the other rotor in an opposite second direction. The exemplary housing assembly 22 includes a rotor housing 48 having an upstream/inlet end face 49 approximately midway along the motor length and a downstream/discharge end face 50 essentially coplanar with the rotor body ends 32 and 36. Many other configurations are possible.

The exemplary housing assembly 22 further comprises a motor/inlet housing 52 having a compressor inlet/suction port 53 at an upstream end and having a downstream face 54 mounted to the rotor housing downstream face (e.g., by bolts through both housing pieces). The assembly 22 further includes an outlet/discharge housing 56 having an upstream face 57 mounted to the rotor housing downstream face and having an outlet/discharge port 58. The exemplary rotor housing, motor/inlet housing, and outlet housing 56 may each be formed as castings subject to further finish machining.

Figure 2:
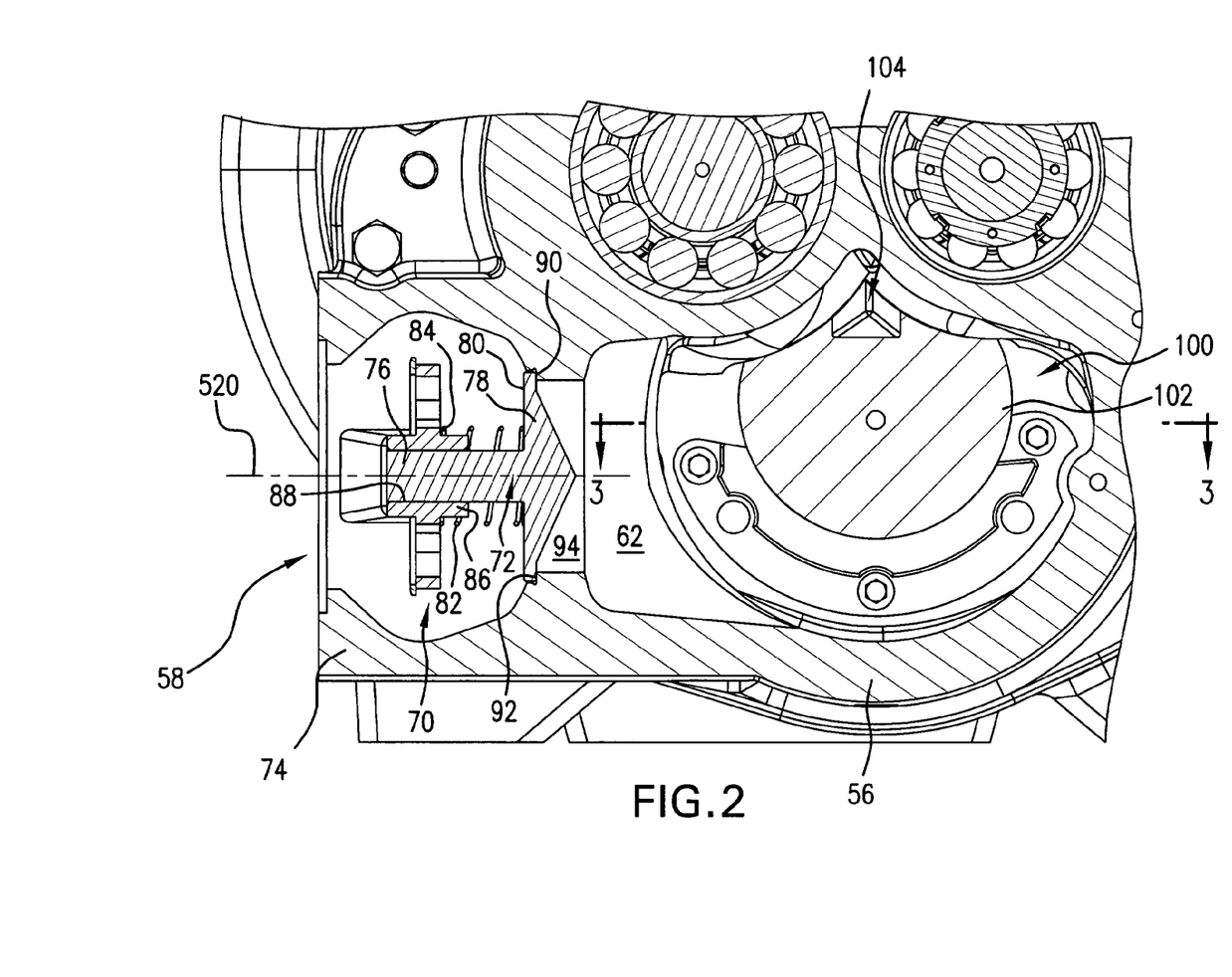
FIG. 2 is a transverse sectional view of a discharge plenum of the compressor of FIG. 1, taken along line 2-2.

Surfaces of the housing assembly 22 combine with the enmeshed rotor bodies 30 and 34 to define inlet and outlet ports to compression pockets compressing and driving a refrigerant flow 504 from a suction (inlet) plenum 60 to a discharge (outlet) plenum 62 (FIG. 2). A series of pairs of male and female compression pockets are formed by the housing assembly 22, male rotor body 30 and female rotor body 34. Each compression pocket is bounded by external surfaces of enmeshed rotors, by portions of cylindrical surfaces of male and female rotor bore surfaces in the rotor case and continuations thereof along a slide valve, and portions of face 57.

FIG. 2 shows further details of the exemplary flowpath at the outlet/discharge port 58. A check valve 70 is provided having a valve element 72 mounted within a boss portion 74 of the outlet housing 56. The exemplary valve element 72 is a front sealing poppet having a stem/shaft 76 unitarily formed with and extending downstream from a head 78 along a valve axis 520. The head has a back/underside surface 80 engaging an upstream end of a compression bias spring 82 (e.g., a metallic coil). The downstream end of the spring engages an upstream-facing shoulder 84 of a bushing/guide 86. The bushing/guide 86 may be unitarily formed with or mounted relative to the housing and has a central bore 88 slidingly accommodating the stem for reciprocal movement between an open condition (not shown) and a closed condition of FIG. 2. The spring 82 biases the element 72 upstream toward the upstream position of the closed condition. In the closed condition, an annular peripheral seating portion 90 of the head upstream surface seats against an annular seat 92 at a downstream end of a port 94 from the discharge plenum.

For capacity control/unloading, the compressor has a slide valve 100 having a valve element 102. The valve element 102 has a portion 104 along the mesh zone between the rotors (i.e., along the high pressure cusp). The exemplary valve element has a first portion 106 (FIG. 3) at the discharge plenum and a second portion 108 at the suction plenum. The valve element is shiftable to control compressor capacity to provide unloading. The exemplary valve is shifted via linear translation parallel to the rotor axes.

Figure 3:
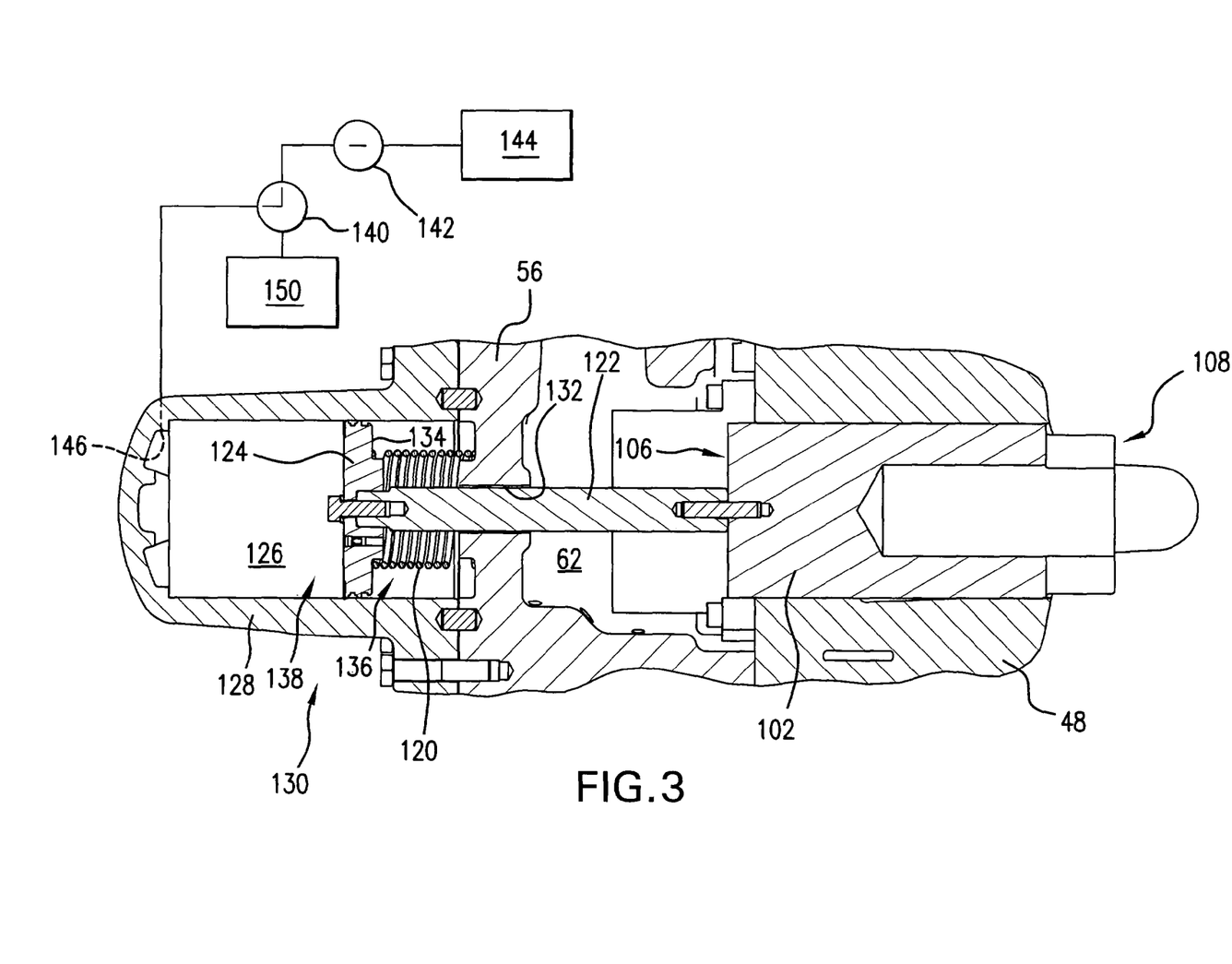
FIG. 3 is a sectional view of a slide valve assembly of the discharge plenum of FIG. 2 in a fully loaded condition, taken along line 3-3.
Figure 4:
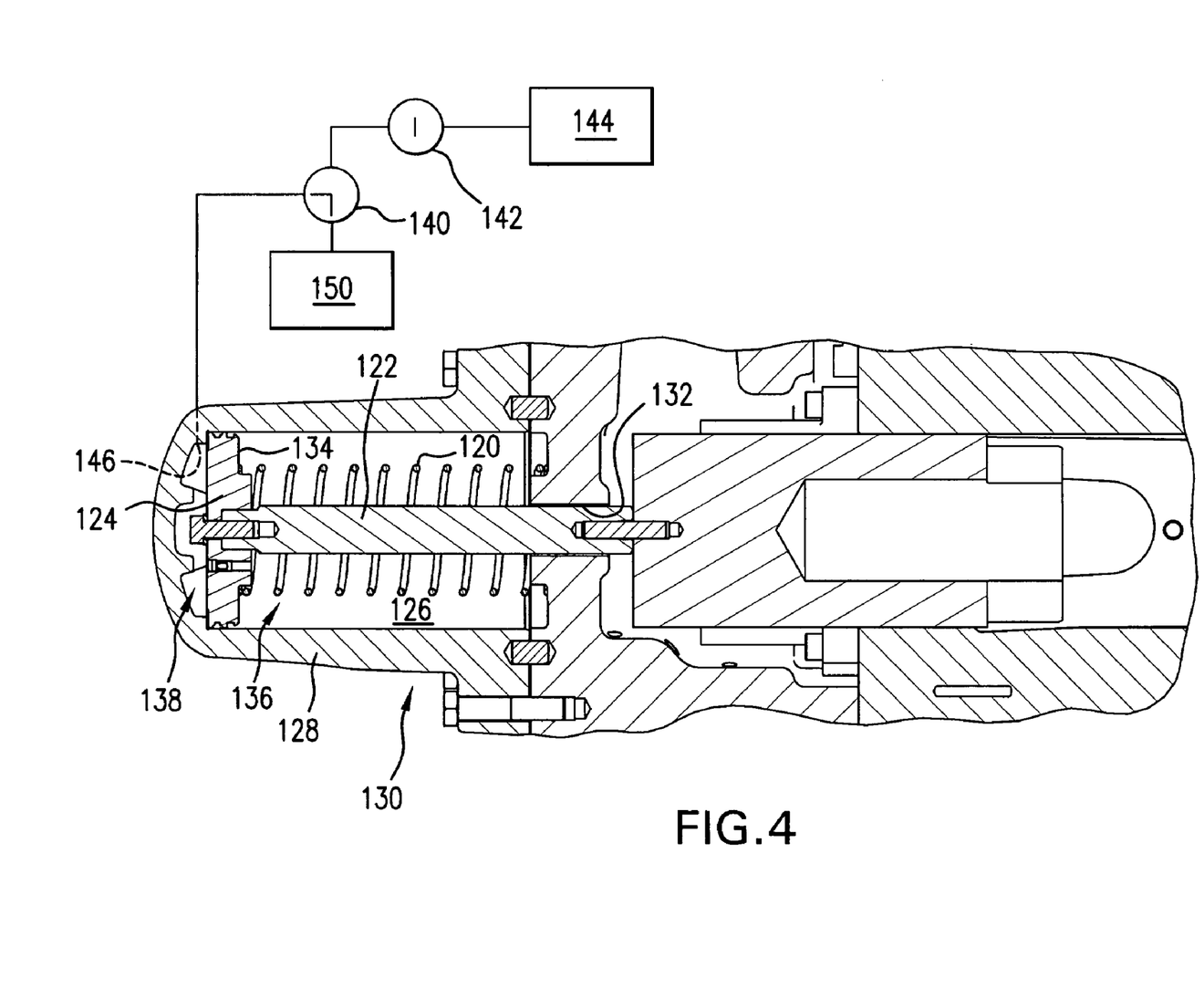
FIG. 4 is a view of the slide valve of FIG. 3 in a relatively unloaded condition.

FIG. 3 shows the valve element at an upstream-most position in its range of motion In this position, the compression pockets close relatively upstream and capacity is a relative maximum (e.g., at least 90% of a maximum displacement volume for the rotors, and often about 99%). FIG. 4 shows the valve element shifted to a downstream-most position. Capacity is reduced in this unloaded condition (e.g., to a displacement volume less than 40% of the FIG. 3 displacement volume or the maximum displacement volume, and often less than 30%). In the exemplary slide valve, shifts between the two positions are driven by a combination of spring force and fluid pressure. A main spring 120 biases the valve element from the loaded to the unloaded positions. In the exemplary valve, the spring 120 is a metal coil spring surrounding a shaft 122 coupling the valve element to a piston 124. The piston is mounted within a bore (interior) 126 of a cylinder 128 formed in a slide case element 130 attached to the outlet case. The shaft passes through an aperture 132 in the outlet case. The spring is compressed between an underside 134 of the piston and the outlet case. A proximal portion 136 of the cylinder interior is in pressure-balancing fluid communication with the discharge plenum via clearance between the aperture and shaft. A headspace 138 is coupled via electronically-controlled solenoid valves 140 and 142 (shown schematically) to a high pressure fluid source 144 at or near discharge conditions (e.g., to an oil separator). A port 146 is schematically shown in the cylinder at the headspace at the end of a conduit network connecting the valves 140 and 142. In an exemplary implementation, the portions of the conduit network may be formed within the castings of the housing components.

The loaded position/condition of FIG. 3 can be achieved by coupling the headspace 138 to the source 144 and isolating it from drain/sink 150 by appropriate control of valves 140 and 142. The unloaded position/condition of FIG. 4 can be achieved by coupling the headspace 138 to the drain/sink 150 and isolating it from source 144 by appropriate control of valves 140 and 142. Intermediate (partly loaded) positions, not shown, can be achieved by alternating connection of headspace 138 to either the source 144 or the drain/sink 150 using appropriately chosen spans of time for connection to each, possibly in combination with isolating the headspace 138 from both source 144 and drain/sink 150 for an appropriately chosen span of time (e.g., via appropriate modulation techniques).

Figure 5:
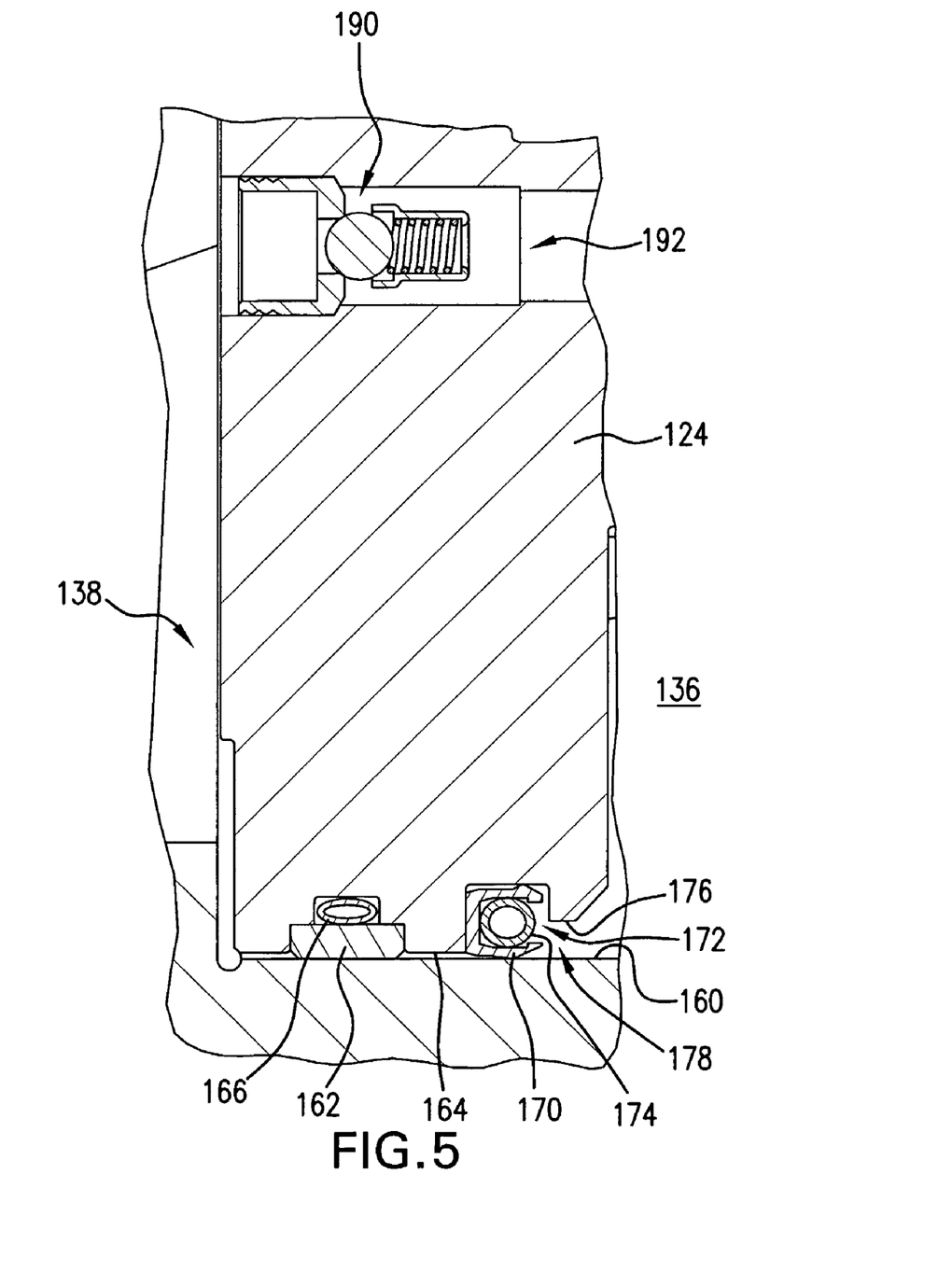
FIG. 5 is a longitudinal sectional view of a piston and cylinder of the valve of FIG. 3.

Low-friction guidance and sealing is advantageously provided between the piston 124 and the bore surface 160. For low-friction guidance, a longitudinally split plastic guide ring 162 of generally longitudinally elongate section is partially accommodated within an annular channel/groove in the outer surface 164 of the piston. The exemplary ring 162 is circumferentially energized by a coil spring 166 inboard thereof in an annular countersunk channel/groove. The exemplary sealing is provided by an annular C-sectioned polymeric sealing ring 170 (e.g., of PTFE) in an annular channel 172 proximally of the ring 162. The seal 170 is energized by a spring 174. For ease of installation, a proximal rim 176 of the channel 172 is slightly radially rebated. This rebating creates a local gap 178 between the piston and wall substantially greater than gaps immediately proximally and distally of the ring 162. The section of the exemplary seal 170 is open longitudinally proximally (i.e., away from the headspace 138 and toward the proximal portion 136 of the bore).

With such a sealing arrangement, potential damage may be caused by excessive pressure in the headspace. For example, such pressure may tend to unwrap and extrude the seal 170 through the gap 178. In normal operation, the headspace is at most at a pressure very close to that of the proximal volume 136. In unloading, it will be substantially less. In loading, it will typically be slightly below or equal. Under certain aberrant conditions, pressure in the headspace may become excessive. Accordingly, some means for pressure relief is advantageously provided. FIG. 5 shows one such means in the form of a pressure relief valve 190 mounted in a passageway 192 through the piston between distal (face) and proximal (underside) surfaces of the piston. The exemplary valve 190 is a one-way spring-loaded pressure relief valve having a predetermined threshold or pop-off pressure. The exemplary valve 190 is normally closed, when the pressure in the headspace exceeds that in the volume 136 by the threshold, this pressure difference will shift the relief valve element against its spring force to open the valve and permit oil to pass from the headspace to the volume 136 until the overpressure is relieved. Reverse flow is not permitted by the exemplary valve 190. Exemplary threshold pressures are ten psi or less (e.g., an exemplary three psi) but may be tailored to address the strength of a given seal. Properties of the valve 190 and the other components of the slide valve may be selected in view of compressor operating conditions so that the valve 190 is only likely to open when the slide valve has reached the fully loaded condition (e.g., bottomed). The spring rate of the main spring 120 may be relevant to this condition.

Figure 6:
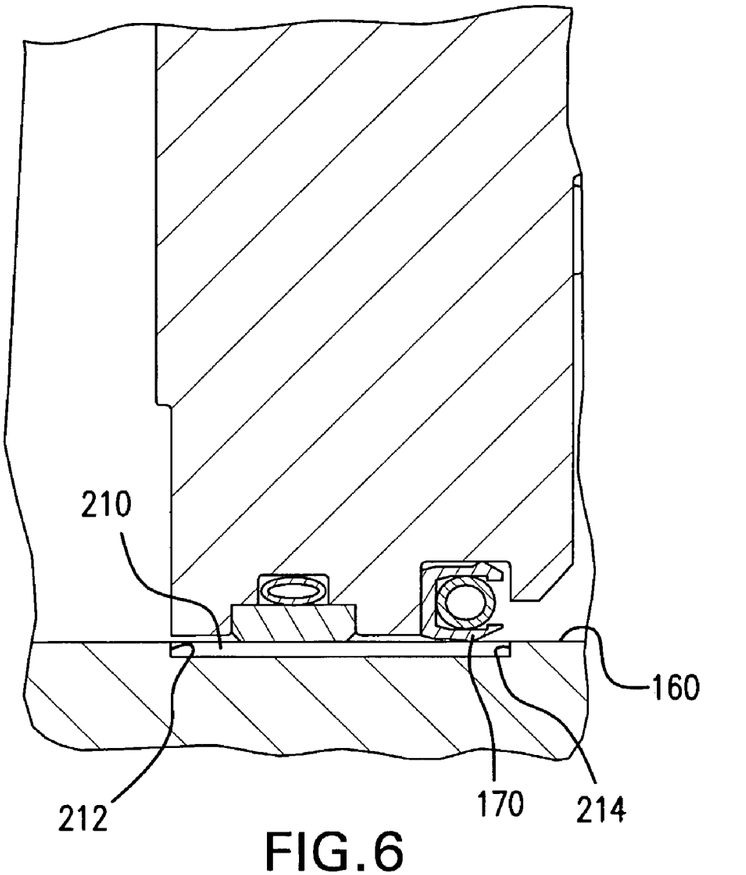
FIG. 6 is a partial longitudinal sectional view of a first alternative piston and cylinder.

FIG. 6 shows an alternate pressure relief means. This means comprises a channel 210 in the surface 160 extending between a distal end 212 and a proximal end 214. The channel is positioned so that in the fully loaded condition the seal 170 falls somewhere between the distal and proximal ends 212 and 214. Thus in the loaded condition, the channel 210 may accommodate a pressure relief flow. If, however, the piston is shifted substantially distally, the sealing ring will fall outside of the channel (e.g., by more than an exemplary 5% of the piston stroke/range). Once the sealing ring is no longer spanned by the channel (e.g., when shifted beyond the channel toward the unloaded condition), the channel will not provide pressure relief and the slide valve will operate otherwise normally. The degree of relief provided may be determined by the size of the channel (e.g., its transverse sectional area). The channel has a longitudinal component and may be exactly longitudinal or may have a tangential component. By having a tangential component (e.g., a helix angle of 10-30°) the interaction between the seal and slide on the one hand and the channel edges on the other hand is eased during movement of the piston.

Figure 7:
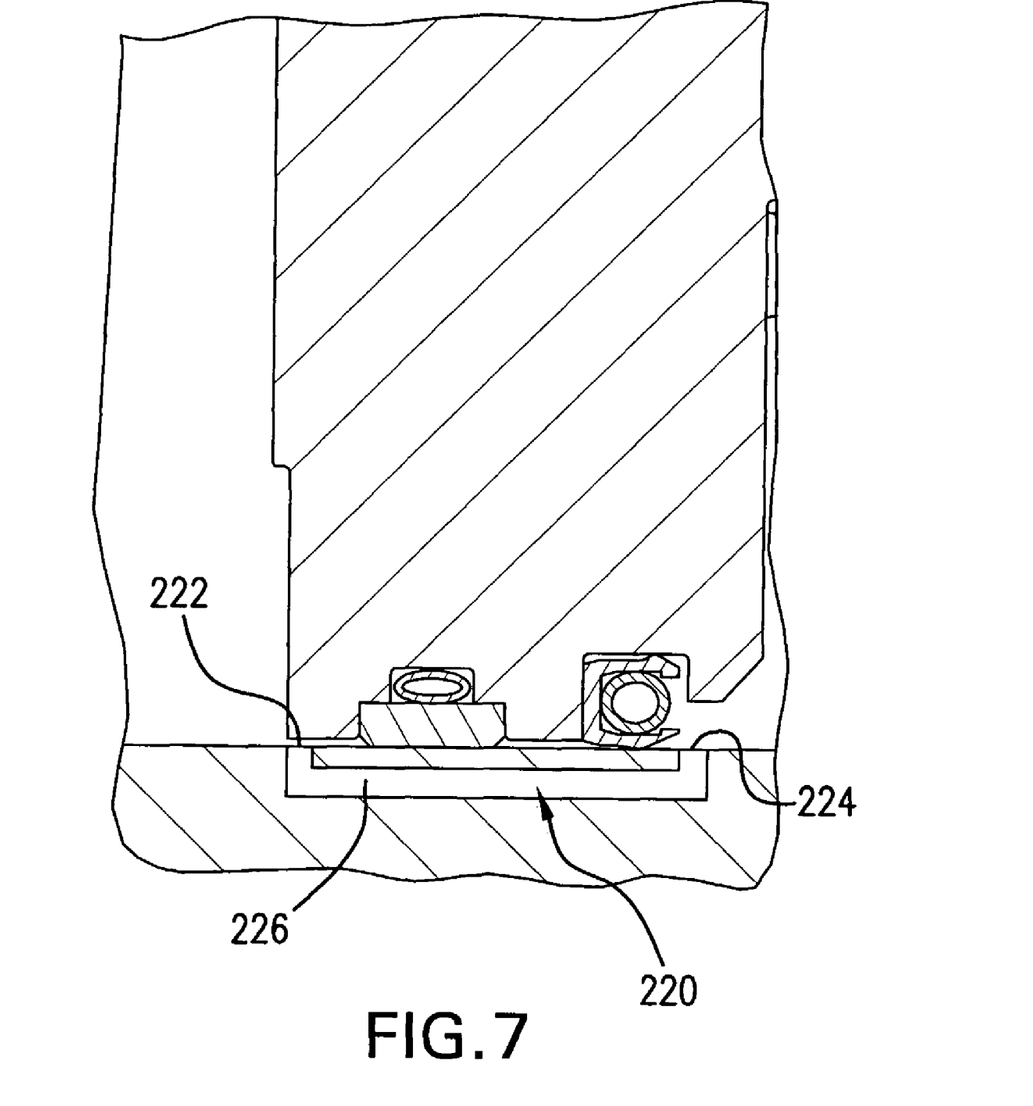
FIG. 7 is a partial longitudinal sectional view of a second alternative piston and cylinder.

FIG. 7 shows yet another alternative pressure relief means wherein a passageway 220 is not an open channel but rather has first and second ports 222 and 224 joined by a trunk 226. The ports may be similarly longitudinally positioned to the ends of the channel 210 of FIG. 6.

One or more embodiments of the present invention have been described. Nevertheless, it will be understood that various modifications may be made without departing from the spirit and scope of the invention. For example, in a reengineering or remanufacturing situation, details of the existing compressor configuration may particularly influence or dictate details of the implementation. Accordingly, other embodiments are within the scope of the following claims.

What is claimed is:

1. A compressor apparatus (20) comprising:
a housing (22) having first (53) and second (58) ports along a flow path;
one or more working elements (26; 28) cooperating with the housing (22) to define a compression path between suction (60) and discharge (62) locations along the flow path; and
an unloading slide valve (100) having:
a single valve element (102) having a range between a first condition and a second condition, the second condition being unloaded relative to the first condition;
a single cylinder (128);
a single piston (124) in the cylinder and mechanically coupled to the valve element and including a body and at least one seal (170) surrounding and carried by the body;
a control valve (140; 142) coupled to a headspace (138) of the cylinder to selectively expose the headspace to a fluid source (144), pressure of fluid in the headspace producing a force on the piston and valve element in a direction from the second condition toward the first condition; and
means (190, 192; 210; 220) for relieving excess pressure in the headspace sufficiently to avoid damage to and dislocation of the seal.

2. The apparatus of claim 1 wherein:
the range is a range of linear translation; and
the means comprises a pressure relief valve (190) carried by the piston.

3. The apparatus of claim 2 wherein the pressure relief valve is a spring-loaded one-way valve.

4. The apparatus of claim 1 wherein:
the means is effective to limit a pressure difference across the piston to less than ten psi.

5. The apparatus of claim 1 further comprising:
a spring (120) biasing the valve element from the first condition toward the third condition.

6. The apparatus of claim 5 wherein:
the spring is under compression when the valve element is along an entirety of said range.

7. The apparatus of claim 5 wherein:
the spring is a metallic coil spring.

8. The compressor of claim 1 wherein the one or more working elements include:
a male-lobed rotor (26) having a first rotational axis (500); and
a female-lobed rotor (28) having a second rotational axis (502) and enmeshed with the male-lobed rotor.

9. The compressor of claim 8 wherein:
in the first condition, the compressor is at least at 90% of a maximum displacement volume; and
in the second condition, compressor is at less than 10% of the first condition displacement volume.

10. The apparatus of claim 1 wherein:
the range is a range of linear translation; and
the compressor is configured so that the means provides the pressure relief only when the valve element is proximate the first condition.

11. The apparatus of claim 1 wherein:
the range is a range of linear translation; and
the compressor is configured so that the means provides the pressure relief only when the valve element is essentially in the first condition.

12. The apparatus of claim 1 wherein:
the means comprises a channel (200; 220) in the cylinder.

13. The apparatus of claim 12 wherein:
the channel is an open channel (200) in an interior surface of the cylinder.

14. The apparatus of claim 12 wherein:
the channel is a passageway (220) having first (222) and second ports (224) in an interior surface of the cylinder.

15. A compressor apparatus comprising:
a housing having first and second ports along a flow path;
one or more working elements cooperating with the housing to define a compression path between suction and discharge locations along the flow path; and
an unloading slide valve having:
a single valve element having a range between a first condition and a second condition, the second condition being unloaded relative to the first condition;
a single cylinder;
a single piston in the cylinder and mechanically coupled to the valve element and including a body and at least one seal (170) surrounding and carried by the body;
a control valve coupled to a headspace of the cylinder to selectively expose the headspace to a fluid source, pressure of fluid in the headspace producing a force on the piston and valve element in a direction from the second condition toward the first condition; and
a passageway (192; 200; 220) positioned to relieve excess pressure in the headspace sufficiently to avoid damage to and dislocation of the seal.

16. The apparatus of claim 15 wherein:
the passageway (192) is through the piston; and
a pressure relief valve (190) is carried by the piston along the passageway.

17. The apparatus of claim 15 wherein a spring-loaded one-way valve (190) is along the passageway (192).

18. The apparatus of claim 15 wherein:
the passageway is an open channel (200) in an interior surface of the cylinder.

19. A method for remanufacturing a compressor (20) or reengineering a configuration of the compressor comprising:
  providing an initial such compressor or configuration having:
    a housing (22);
    one or more working elements (26; 28) cooperating with the housing to define a compression path between suction (60) and discharge (62) locations; and
    an unloading slide valve (100) having:
      a valve element (102) having a range between a first condition and a second condition, the second condition being unloaded relative to the first condition;
      a cylinder (128);
      a piston (104) in the cylinder and mechanically coupled to the valve element and including a body and at least one seal (170) surrounding and carried by the body; and
      a fluid in a headspace (138) of the cylinder, pressure of the fluid in the headspace producing a force on the piston and valve element in a direction from the second condition toward the first condition; and
  adapting such compressor or configuration to include means (190, 192; 210; 220) for relieving excess pressure in the headspace effective to relieve the excess pressure sufficiently to avoid damage to and dislocation of the seal.

20. The method of claim 19 wherein:
  the adapting includes selecting at least one parameter of the means to provide a desired limit on said excess pressure.

21. The method of claim 20 wherein the selecting comprises an iterative:
  varying of said at least one parameter; and
  directly or indirectly determining a level of excess pressure permitted by the means.

22. The method of claim 21 wherein:
  the varying comprises varying a cross-sectional area of a passageway (200; 220) in the cylinder.

* * * * *